United States Patent
Gauci (10) Patent No.: US 11,872,960 B2
(45) Date of Patent: *Jan. 16, 2024

(54) UNIVERSAL MOUNTING ROOF RACK ASSEMBLY

(71) Applicant: Lund Motion Products, Inc., Buford, GA (US)

(72) Inventor: Jason Gauci, Cumming, GA (US)

(73) Assignee: Lund Motion Products, Inc., Buford, GA (US)

( * ) Notice: Subject to any disclaimer, the term of this patent is extended or adjusted under 35 U.S.C. 154(b) by 7 days.

This patent is subject to a terminal disclaimer.

(21) Appl. No.: 17/654,906

(22) Filed: Mar. 15, 2022

(65) Prior Publication Data

US 2022/0203902 A1  Jun. 30, 2022

Related U.S. Application Data

(63) Continuation of application No. 16/434,755, filed on Jun. 7, 2019, now Pat. No. 11,279,295.

(60) Provisional application No. 62/750,739, filed on Oct. 25, 2018, provisional application No. 62/682,657, filed on Jun. 8, 2018.

(51) Int. Cl.
  *B60R 9/058*  (2006.01)
(52) U.S. Cl.
  CPC .................................. *B60R 9/058* (2013.01)
(58) Field of Classification Search
  CPC ....................................................... B60R 9/058
  USPC ......................................................... 224/329
  See application file for complete search history.

(56) References Cited

U.S. PATENT DOCUMENTS

| 2,782,972 | A | | 2/1957 | Binding |
| 3,064,868 | A | | 11/1962 | Treydte |
| 3,142,104 | A | | 7/1964 | Nielsen, Jr. |
| 3,385,488 | A | | 5/1968 | Bronson |
| 3,920,167 | A | | 11/1975 | Parsons |
| 4,076,157 | A | | 2/1978 | Hedstrom et al. |
| 4,166,560 | A | | 9/1979 | Werner et al. |
| 4,728,019 | A | | 3/1988 | Olliges |
| 4,752,022 | A | * | 6/1988 | Thulin ................. B60R 9/058 224/314 |
| 6,491,192 | B2 | | 12/2002 | Aki |
| 2006/0131934 | A1 | | 6/2006 | Uchida et al. |
| 2016/0039352 | A1 | * | 2/2016 | Buchman ............ B60R 9/058 224/329 |
| 2019/0375337 | A1 | | 12/2019 | Gauci |

FOREIGN PATENT DOCUMENTS

| DE | 1455831 | 8/1964 |
| DE | 3445021 | 12/1984 |
| EP | 0736417 | 4/1996 |

* cited by examiner

*Primary Examiner* — Peter N Helvey
(74) *Attorney, Agent, or Firm* — Knobbe, Martens, Olson & Bear, LLP (57) ABSTRACT

Disclosed herein are embodiments of a roof rack assembly for use with a vehicle and related methods. The roof rack assembly can include a plurality of attachment assemblies with gutter inserts configured to extend within rain gutters of a vehicle. The attachment assemblies can also include clamps that are configured to at least partially wrap around a frame of the vehicle. The roof rack assembly can be attached to a vehicle without drilling and can be adjustable such that it is compatible with various vehicles.

20 Claims, 9 Drawing Sheets

UNIVERSAL MOUNTING ROOF RACK ASSEMBLY

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure is generally related to roof rack assemblies and related methods.

Description of the Related Art

Roof rack assemblies are configured for mounting racks to vehicles.

SUMMARY

Disclosed herein are embodiments of a universal roof rack assembly for a vehicle, the universal roof rack assembly comprising a roof rack body, a plurality of attachment assemblies, each of the plurality of attachment assemblies attached to the roof rack body or a brace supporting the roof rack body, each of the plurality of attachment assemblies comprising a gutter insert configured to extend within a rain gutter or rain duct of a vehicle, the gutter insert having a first portion defining a first surface configured to face inboards of the vehicle and a second portion separate from the first portion and defining a second surface configured to face outboards of the vehicle, wherein the first surface and the second surface form an acute angle, and a clamp attached to the gutter insert, the clamp configured to at least partially extend into and at least partially wrap around a frame of the vehicle, wherein the universal roof rack assembly is configured to attach to the vehicle without drilling.

In some embodiments, the frame of the vehicle is a door frame. In some embodiments, the attachment assembly can extend in an opposite direction from a pair of laterally extending bars from the roof rack body. In some embodiments, dimensions of the gutter insert can be modified by a user. In some embodiments, the gutter insert can be positioned between the roof rack body and the clamp. In some embodiments, the first surface and the second surface can form an angle between 10-45°. In some embodiments, the gutter insert can further comprise a third portion spacing the first portion from the second portion.

In some embodiments, the clamp can be adjustably connected to the gutter insert. In some embodiments, each of the clamp and the gutter insert can define a track configured to receive a fastener. The track of the clamp can be configured to align with the track of the gutter insert such that a relative position of the clamp and the gutter insert is adjustable. In some embodiments, the roof rack assembly defines a height and a width. In some embodiments, at least one of the height and the width of the roof rack assembly are adjustable. In some embodiments, both the height and the width of the roof rack assembly are adjustable.

In some embodiments, each of the plurality of attachment assemblies can include a cushion connected to a portion of the attachment assembly that is configured to contact the vehicle.

Also disclosed herein are embodiments of a vehicle having a universal roof rack assembly as disclosed herein.

Further disclosed herein are embodiments of a vehicle comprising a roof having a rain gutter defined by a first section defining a first surface, a second section defining a second surface generally opposite the first surface, and a third section connecting the first surface and the second surface, and a universal roof rack assembly for a vehicle, the universal roof rack assembly comprising a roof rack body, a plurality of attachment assemblies, each of the plurality of attachment assemblies attached to the roof rack body or a brace supporting the roof rack body, each of the plurality of attachment assemblies comprising a gutter insert configured to face within the rain gutter, the gutter insert having a first portion defining a first surface configured to extend inboards of the vehicle and a second portion separate from the first portion and defining a second surface configured to face outboards of the vehicle, wherein the first surface and the second surface form an acute angle, and a clamp attached to the gutter insert, the clamp configured to at least partially extend into and at least partially wrap around a frame of the vehicle, wherein the universal roof rack assembly is configured to attach to the vehicle without drilling, and wherein the first surface of the gutter insert is configured to contact the first surface of the rain gutter and the second surface of the gutter insert is configured to contact the second surface of the rain gutter, wherein the gutter insert is received into and mates with the rain gutter.

In some embodiments, the frame of the vehicle is a door frame. In some embodiments, dimensions of the gutter insert can be modified by a user. In some embodiments, the first surface and the second surface of the gutter insert can form an angle between 10-45°. The gutter insert can include a third portion spacing the first portion from the second portion.

In some embodiments, the clamp can be adjustably connected to the gutter insert. Each of the clamp and the gutter insert can define a track configured to receive a fastener. The track of the clamp can be configured to align with the track of the gutter insert such that a relative position of the clamp and the gutter insert is adjustable.

In some embodiments, each of the plurality of attachment assemblies can include a cushion connected to a portion of the attachment assembly that contacts the vehicle.

DETAILED DESCRIPTION

Disclosed herein are embodiments of a roof rack assembly, in particular a universal mounting roof rack, and methods of attachment. Advantageously, embodiments of the disclosure can be attached to a number of different vehicles having different shapes and sizes, without damaging the vehicle such as by drilling or screwing into a surface of the vehicle. Thus, the universal mounting roof rack assembly can have a no-drill installation. The roof rack assembly can be attached and detached without any permanent effect/damage to the vehicle. The roof rack assembly can be attached to, for example, cars, vans trucks, Jeeps, sports utility vehicles, etc.

Embodiments of the disclosure allow for the roof rack assembly to be installed at different locations on the roof of a vehicle. Further, the roof rack assembly can adjusted in position along the roof of the vehicle as needed. Additionally, the roof rack assembly can put weight on the gutters, and not directly on the roof, which can advantageously spread around the weight. Rain gutters are typically more reinforced than the roof itself. In some embodiments, the roof rack may weigh 350 lbs. or more.

Figure 1:
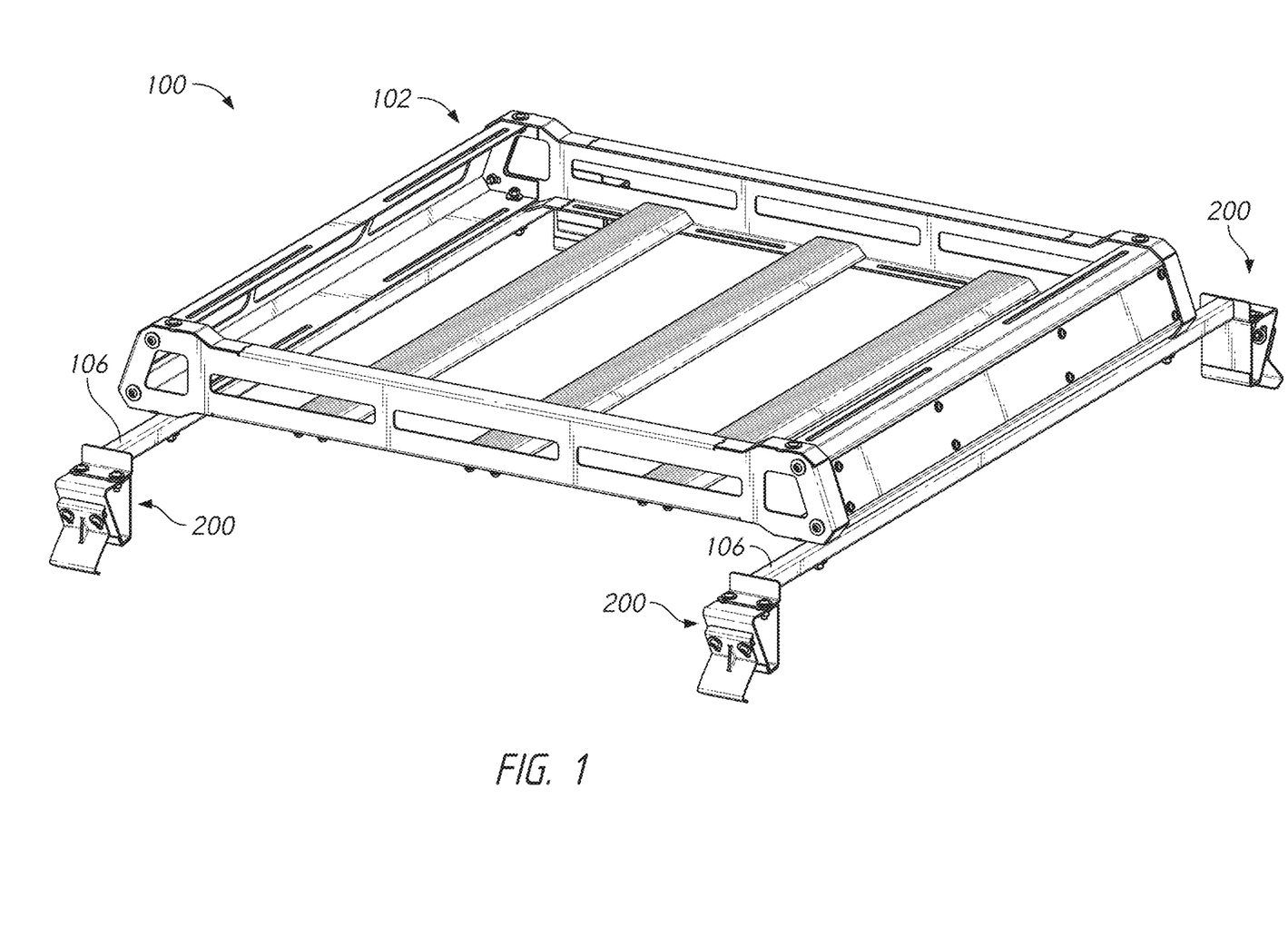
FIGS. 1 and 2 illustrate embodiments of a universal mounting roof rack assembly.
Figure 2:
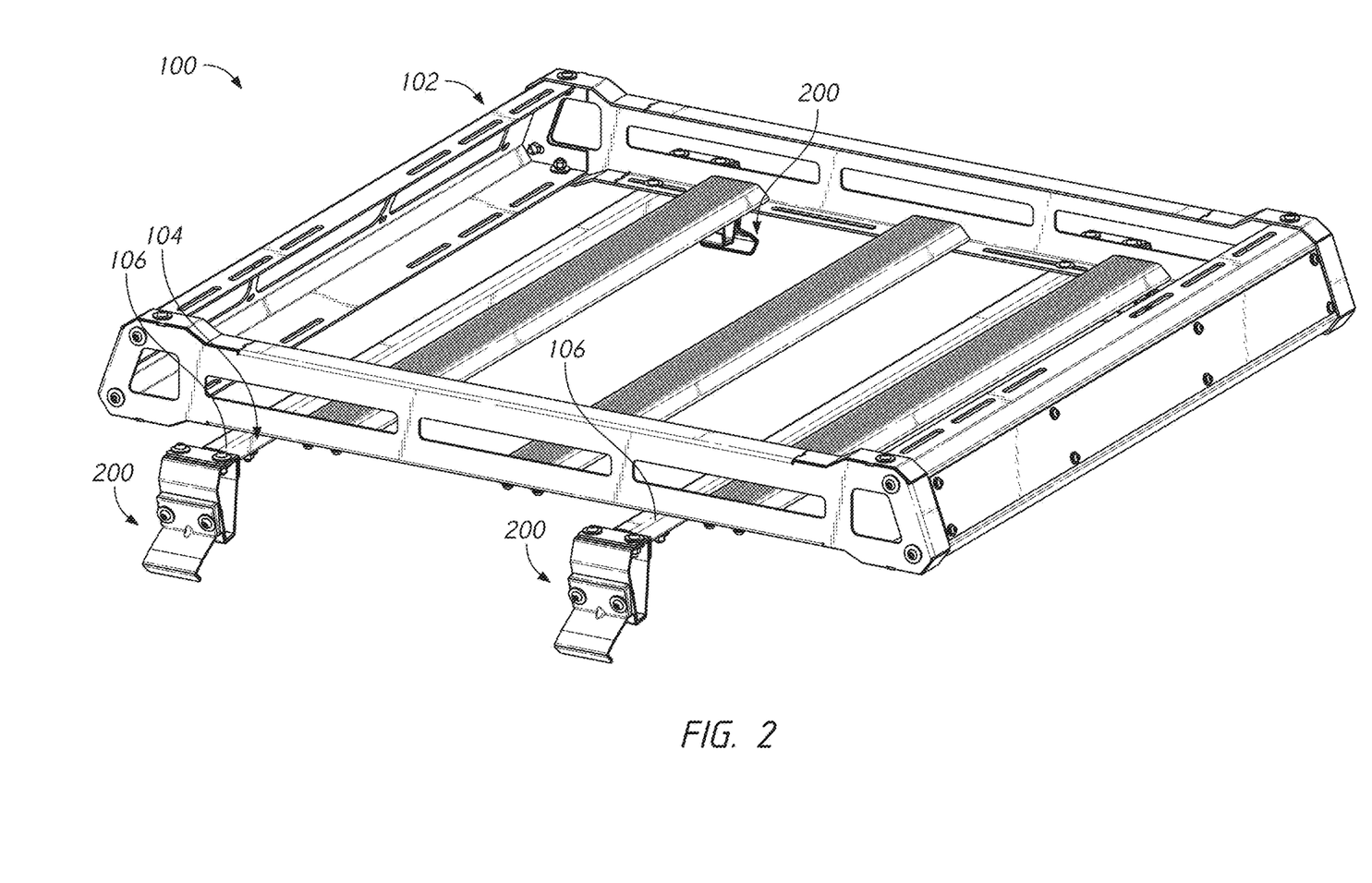
Figure 3:
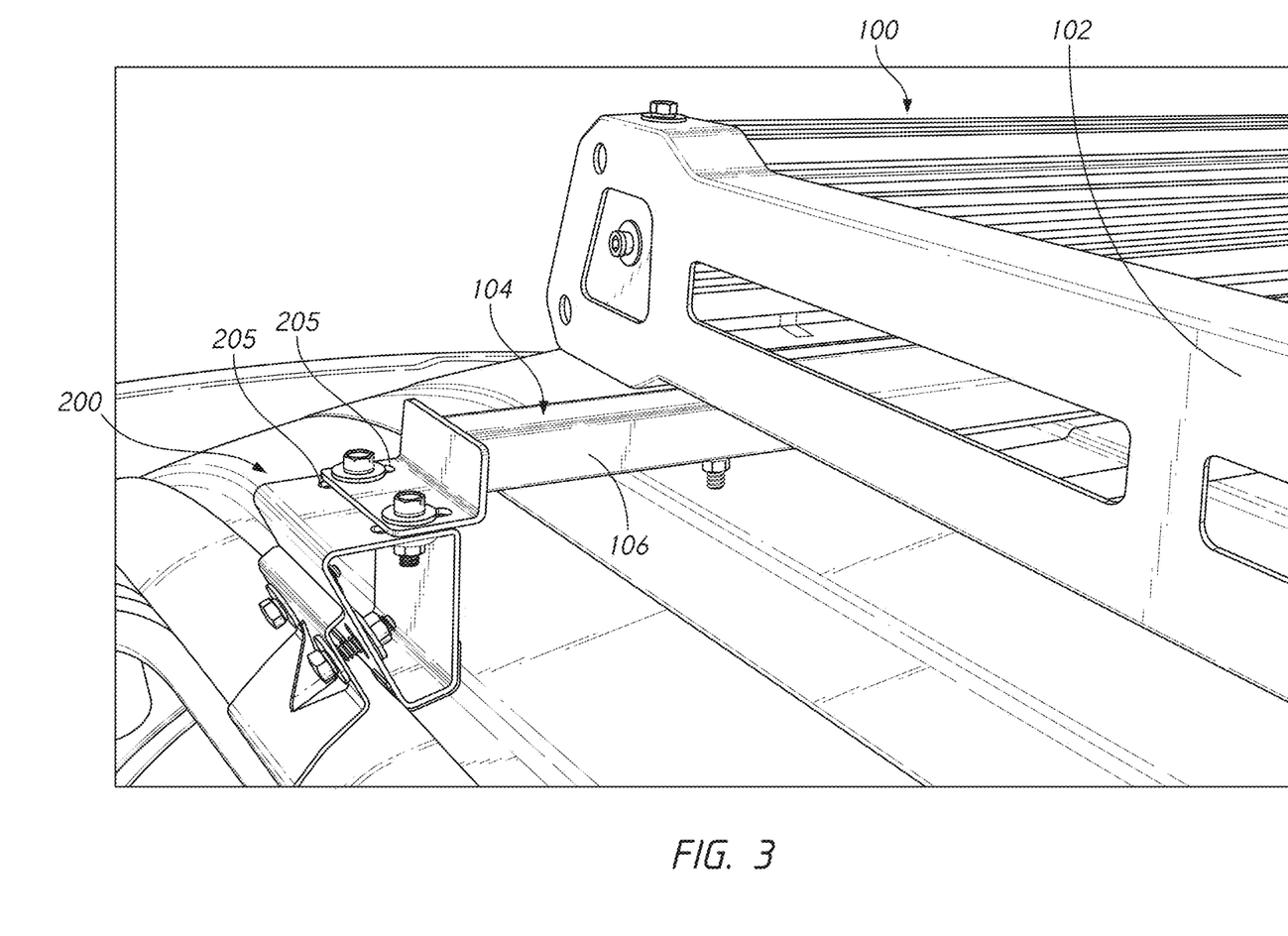
FIG. 3 illustrates an embodiment of a universal mounting roof rack assembly attached to a vehicle.

FIGS. 1-3 illustrate embodiments of the universal roof rack or universal roof rack assembly 100. As shown, the roof rack can include a roof rack body 102. The roof rack body 102 can be similar to the body of standard roof racks and can include slots, stacking features, moveable components, etc.

The roof rack body 102 can be attached to an attachment section 104. The body 102 and the attachment section 104 can be permanently or removably attached to one another. The roof rack assembly 100 can include two attachment sections 104, one generally at the front of the body 102 and one generally at the back of the body 102. In some embodiments, the roof rack assembly 100 can include 1, 2, 3, 4, 5, or 6 attachment sections 104. In some embodiments, the roof rack assembly 100 can include greater than 1, 2, 3, 4, 5, or 6 attachment sections 104. In some embodiments, the roof rack assembly 100 can include less than 2, 3, 4, 5, or 6 attachment sections 104.

The body 102 may define a generally rectangular frame including one or more support beams defining surfaces upon which a payload such as suitcases may be supported. In the illustrated embodiment the rack forms a plurality of laterally extending spaced support surfaces which provide support for items within the frame, but desirably weigh less than a single support spanning the length and width of the frame. Each of the attachment sections 104 can include a cross-bar, such as a lateral bar 106, extending along a width of the body 102. In some embodiments, the lateral bars 106 are parallel with one another. In some embodiments, the lateral bars 106 are not parallel. In some embodiments, the lateral bar 106 may be shorter, equal to, or wider than a width of the body 102. As shown, the body 102 can be attached to a top surface of the lateral bar 106. The body 102 can be permanently or removably attached to the lateral bar 106. The lateral bar 106 can have a generally rectangular cross section, but other shapes can be used as well (e.g., square, triangular, trapezoidal) and the particular shape does not limit the disclosure.

At opposite ends of the lateral bar 106, the roof rack assembly 100 can include an attachment assembly 200. Thus, when two lateral bars 106 are used, four attachment assemblies 200 can be used. In some embodiments, the number of attachment assemblies 200 is double the number of lateral bars 106. In some embodiments, the attachment assemblies 200 are all generally the same. In some embodiments, some of the attachment assemblies 200 can be different, such as including new components or removing certain components. In some embodiments, attachment assemblies 200 on opposite sides of the lateral bar 106 are mirror images. An enlarged view of the attachment assembly 200 is shown in FIGS. 4-10.

In other embodiments, the attachment assemblies 200 are attached to or integrally formed with the body 102. As shown, the lateral ends of the lateral bar 106 can be attached to a cross-bar support, such as a connecting mount 202. The connecting mount 202 can be permanently or removably coupled to the end of the lateral bar 106. In some embodiments, the connecting mount 202 can be generally L-shaped, thus having a vertical section 204, a horizontal section 206, and a bend 208 between the two. Thus, the vertical section 204 can attach to the lateral bar 106. The vertical section 204 can extend upward or downward relative to the horizontal section 206 of the connecting mount 202. In some embodiments, the vertical section 204 can contact a lateral surface of the gutter insert 210. The lateral bar 106 can attach to the vertical section 204 such that a top surface of the lateral bar 106 is disposed above the gutter insert 210 (e.g., as shown in FIG. 3), coplanar with a top portion 212 of the gutter insert 210 (e.g., as shown in FIG. 4), and/or below the top portion 212 of the gutter insert 210.

In some embodiments, the connecting mount 202 may not be used, and all the following components can be directly attached to the lateral bar 106, such as on a bottom surface of the lateral bar 106.

Figure 9:
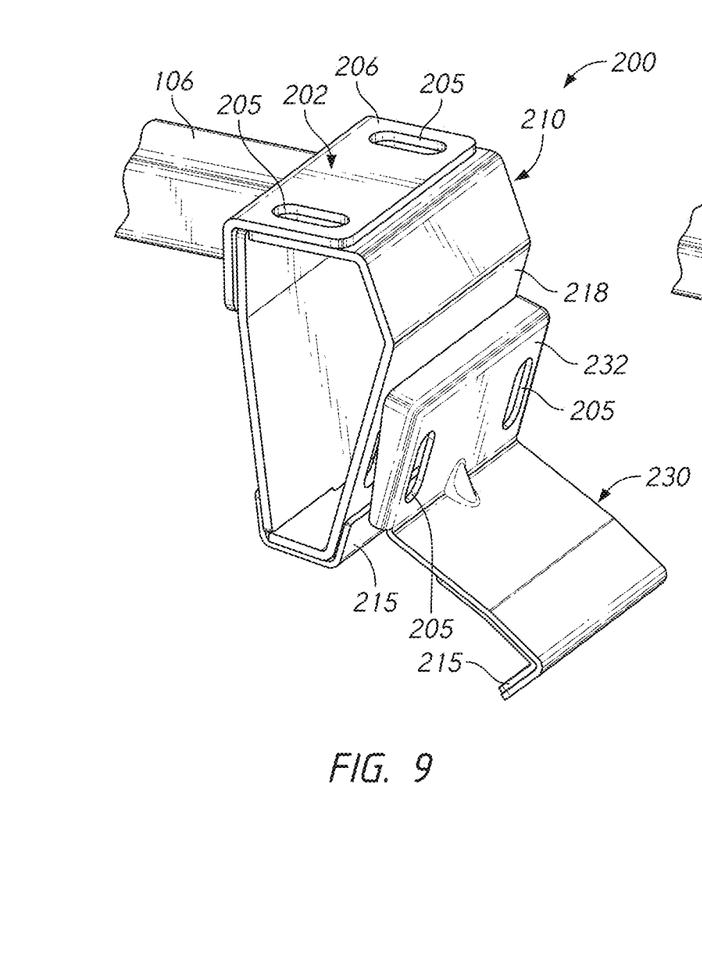
FIGS. 9 and 10 illustrate detailed and exploded views of the attachment assembly of FIG. 8B without fasteners.
Figure 10:
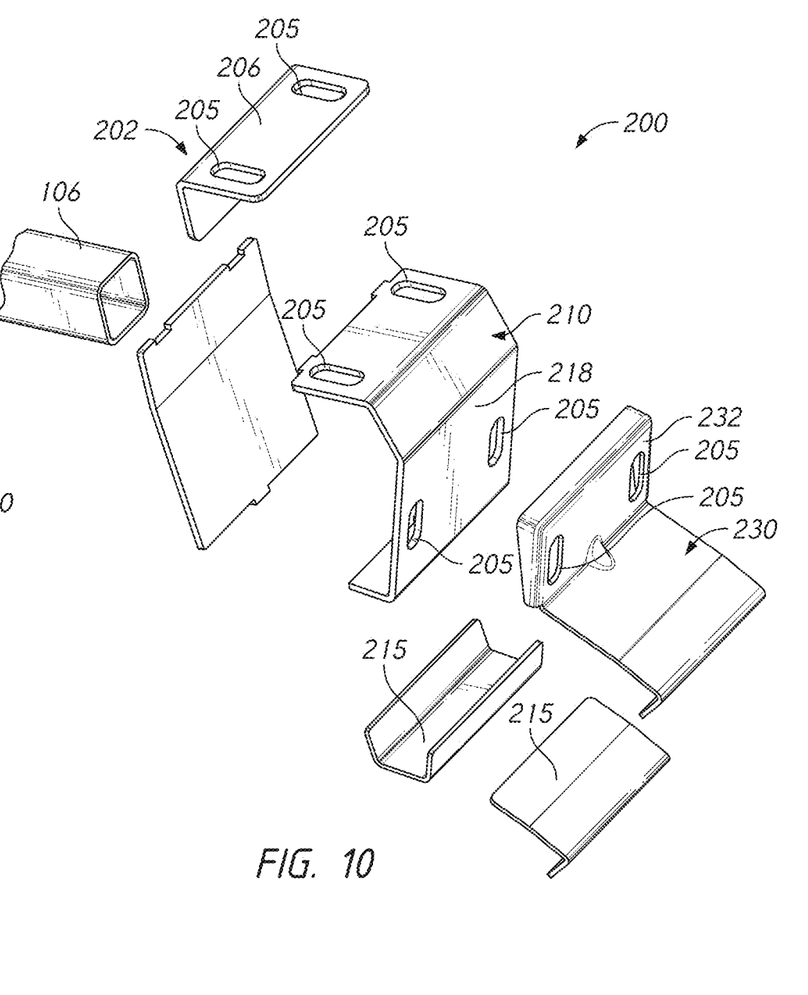

A gutter insert 210 can be attached to a bottom side of the horizontal section 206. For example, the gutter insert 210 can be attached to the horizontal section 206 through fasteners such as screws, bolts, adhesives, solder, etc. In some embodiments, two bolts can be used. As shown in FIGS. 9 and 10, both the gutter insert 210 and the horizontal section 206 of the connecting mount 202 may include slots 205, such as tracks, for fasteners to insert into. Thus, the fastener position can be adjusted within the slots 205 in order to adjust the position of the gutter insert 210 with respect to the lateral bar 106. In some embodiments, the slots 205 can extend in different dimensions, such as vertically and/or horizontally, allowing further adjustability. This can advantageously allow for adjustability of a height of the roof rack assembly 100 (e.g., a distance between the door clip 230 and the roof rack body 102) and/or adjustability of a width of the roof rack assembly 100 (e.g., a distance between lateral sides of the roof rack assembly 100).

Figure 4:
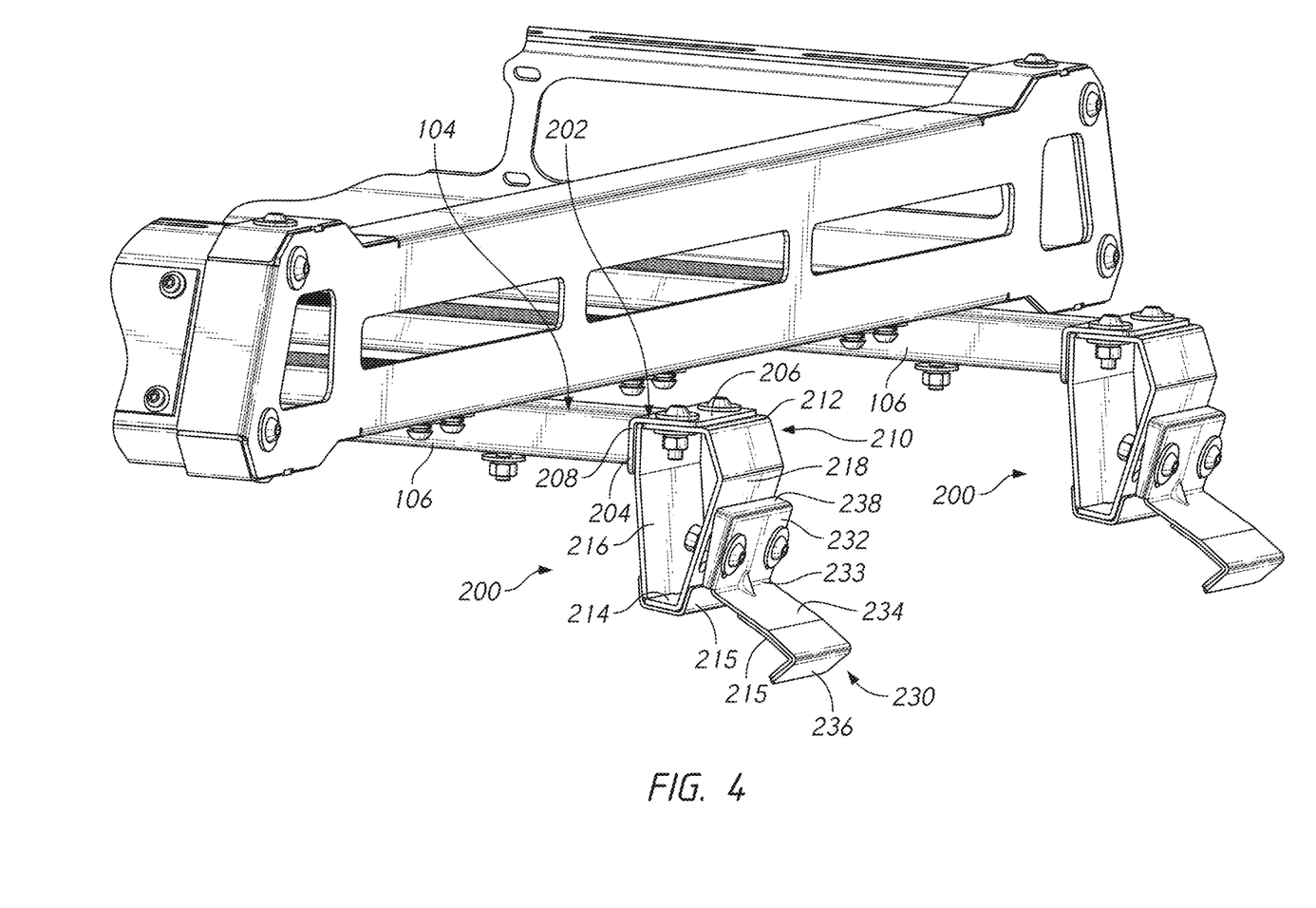
FIGS. 4 and 5 illustrate detailed views of the universal mounting roof rack assembly of FIG. 2.
Figure 5:
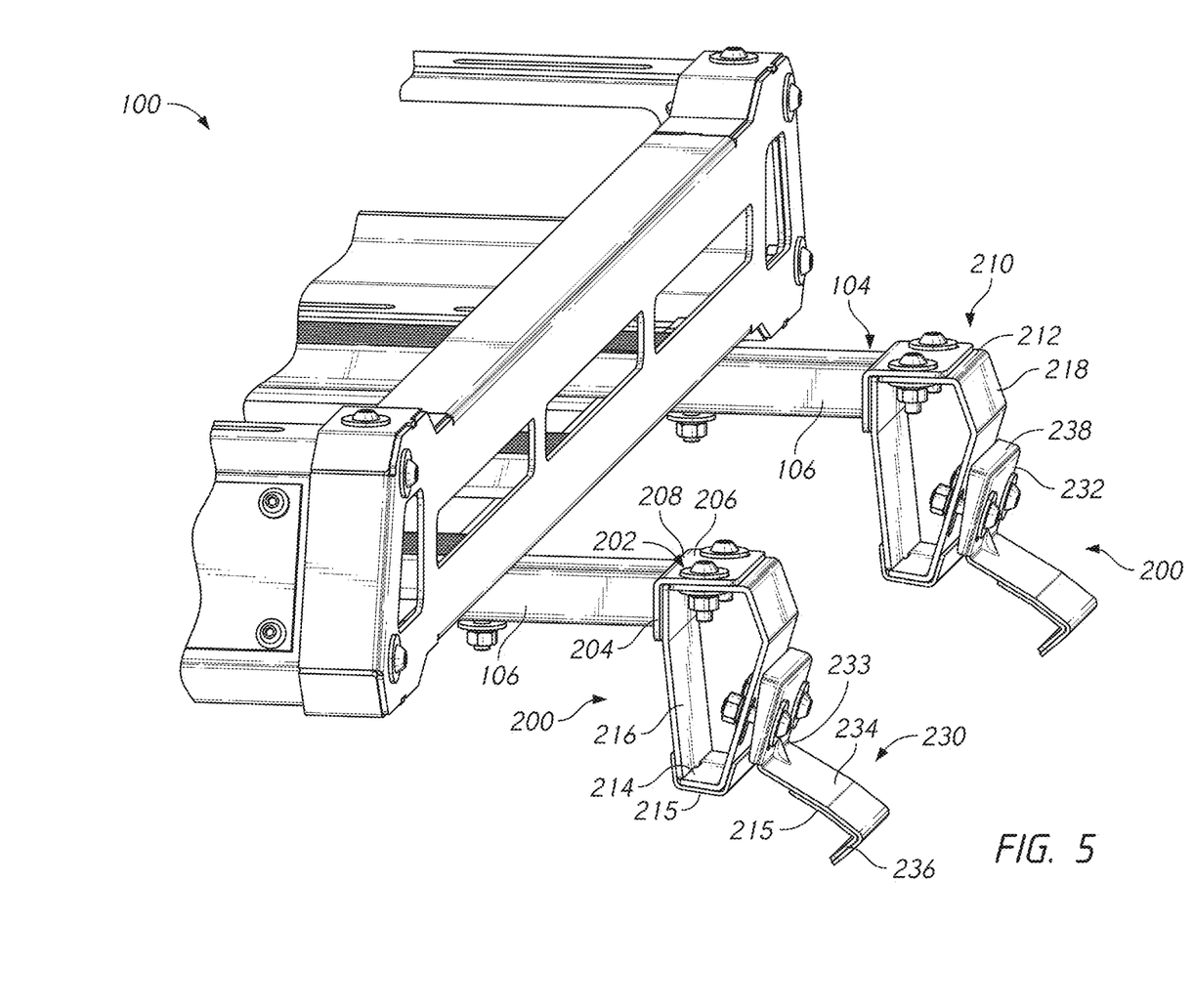
Figure 6:
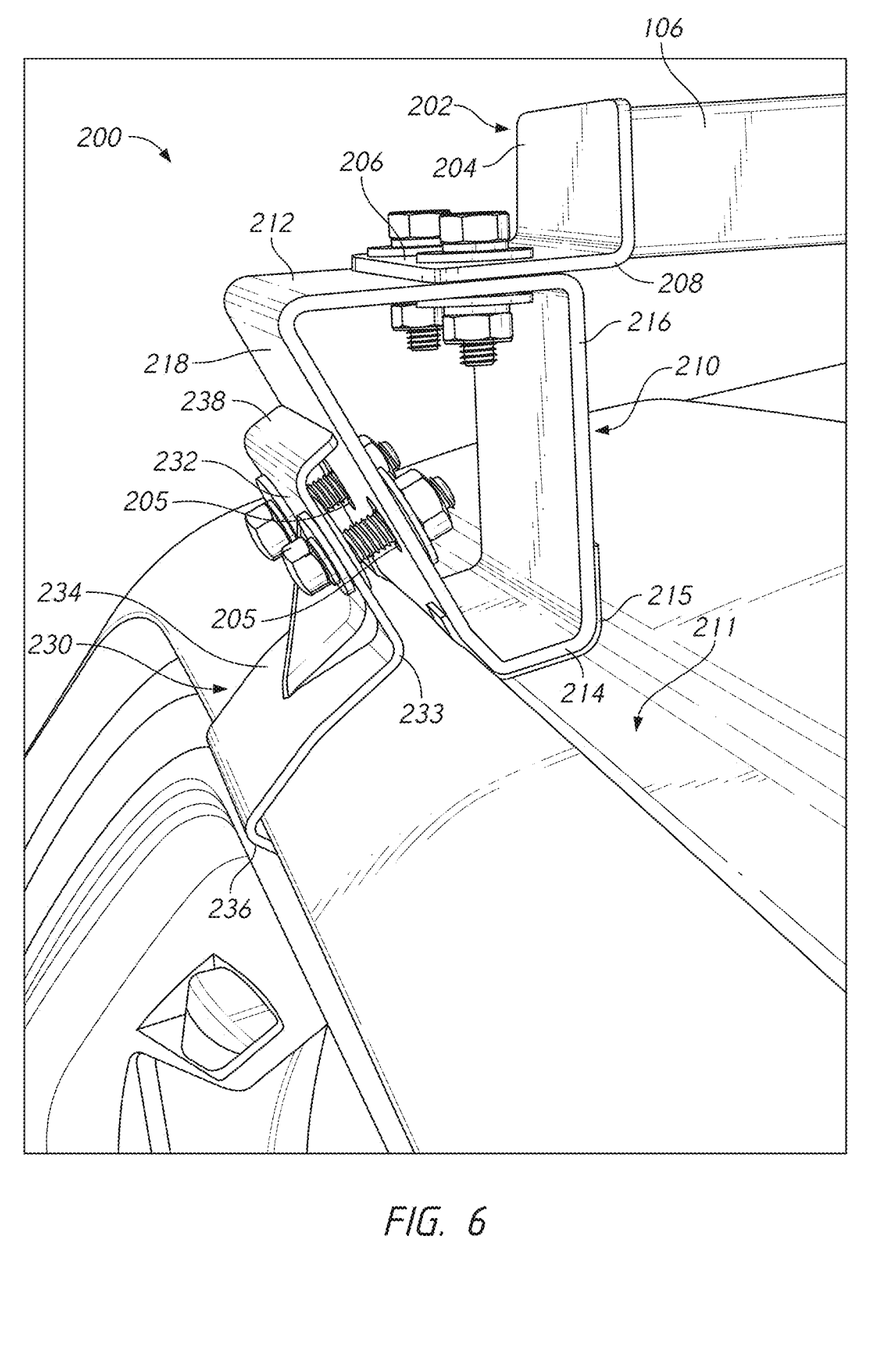
FIGS. 6 and 7 illustrate embodiments of a universal mounting roof rack assembly attached to a vehicle.
Figure 7:
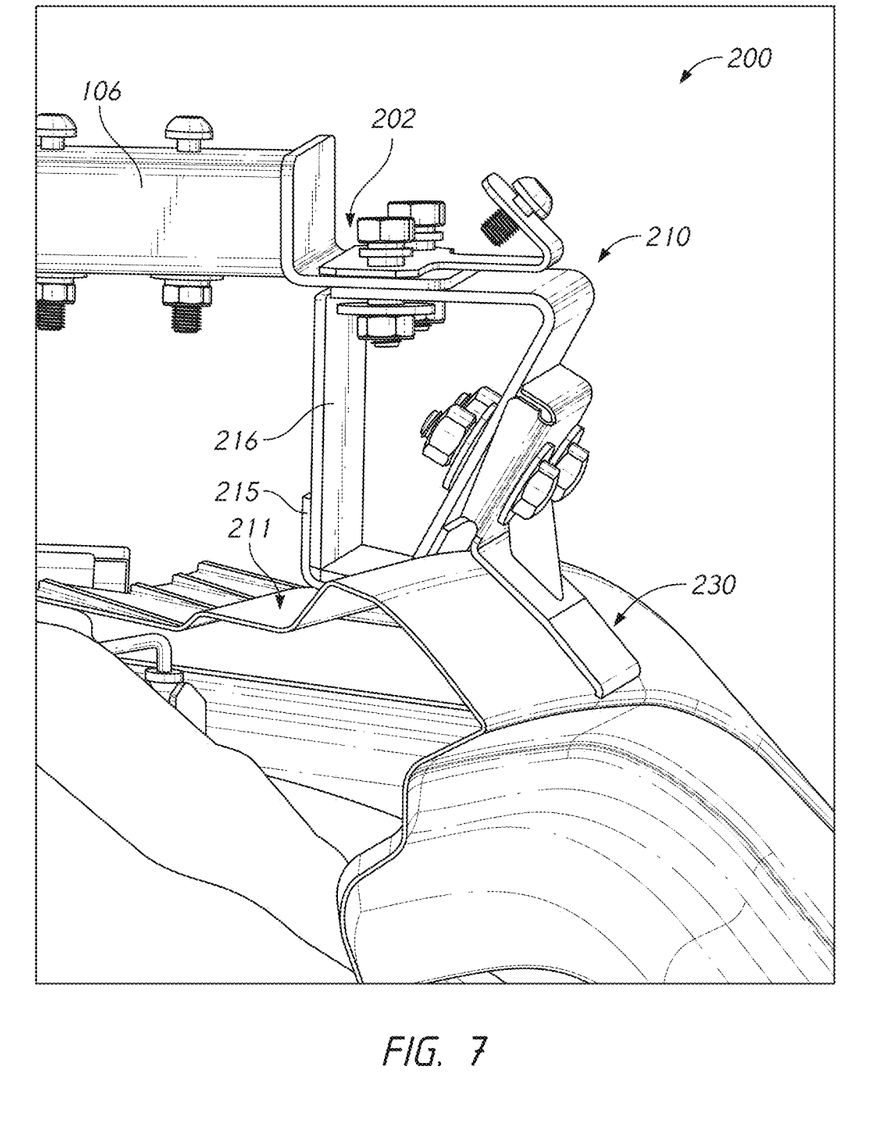
Figure 8A:
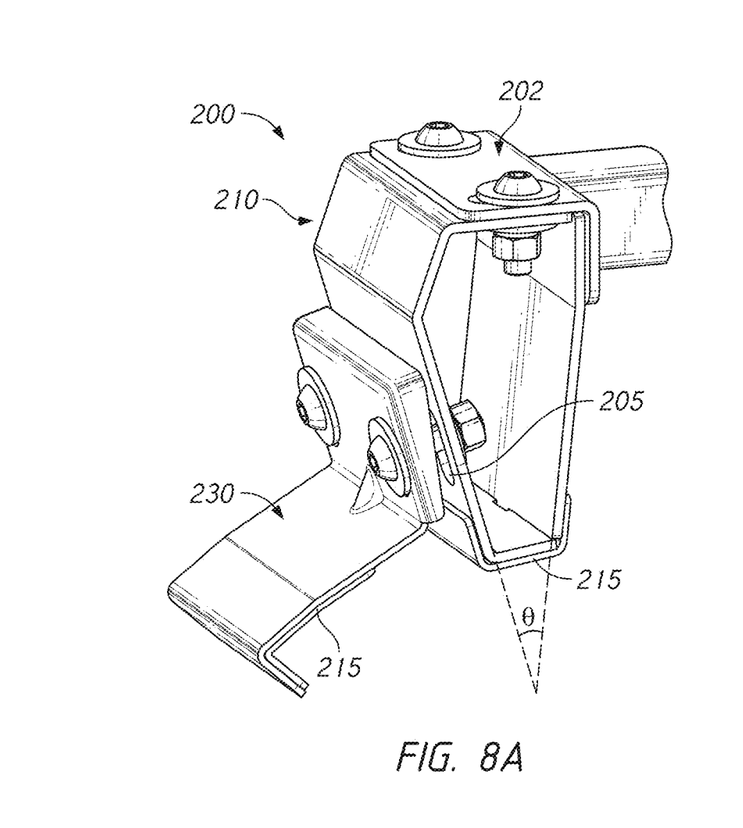
FIGS. 8A and 8B illustrate detailed views of an embodiment of an attachment assembly.
Figure 8B:
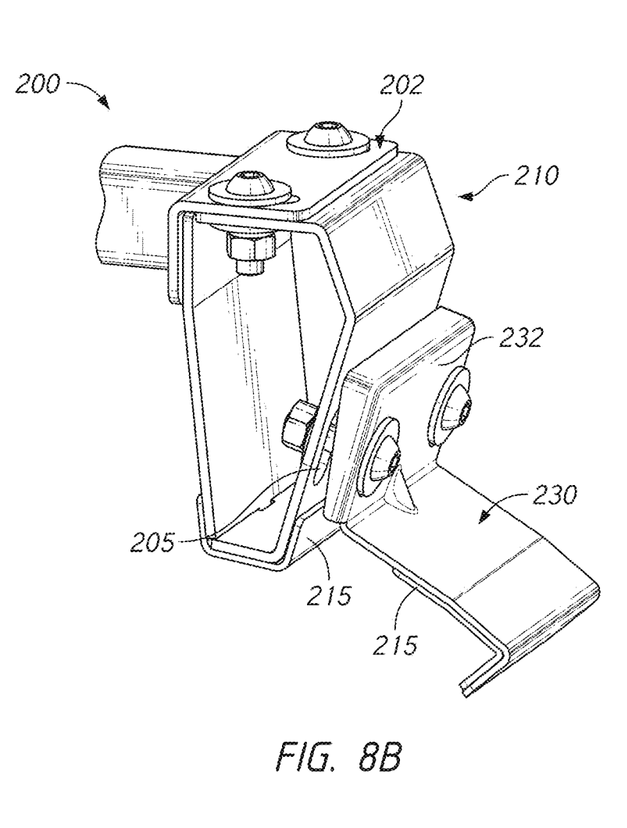

As shown in FIGS. 4-6, the gutter insert 210 can include a top portion 212, a base or connector, such as a bottom portion 214, a support strut, such as an inner connecting surface 216, and a clamp mount, such as an outer connecting surface 218. The outer connecting surface 218 can include a connecting flange. The bottom portion 214 can be configured to fit within a gutter (rain gutter, duct, rain duct) 211 of a vehicle. In some embodiments, the bottom portion 214 can be frictionally held within a gutter. In some embodiments, the top portion 212 can have the same dimensions as the bottom portion 214, thus forming a generally rectangular gutter insert 210. In some embodiments, the top portion 212 can be longer than the bottom portion 214, thereby forming a generally trapezoidal shape as shown in FIG. 6. In some embodiments, the top portion 212 can have a width (e.g., measured between the passenger side and the driver side of a vehicle) of 1.5, 2, or 2.5 times a width of the bottom portion 214. In some embodiments, the top portion 212 can have a width of greater than 1.5, 2, or 2.5 times a width of the bottom portion 214. In some embodiments, the top portion 212 can have a width of less than 1.5, 2, or 2.5 times a width of the bottom portion 214. The dimensions of the inner connecting surface 216 and the outer connecting surface 218 can vary depending on the dimensions of the top/bottom surfaces 212/214.

In some embodiments, the attachment assembly 200 can further comprise at least one resilient layer, such as a cushion 215. As illustrated in FIGS. 4, 5, 8A, 8B, 9, and 10, cushions 215 can be attached to the portions of the attachment assembly 200 that contact the vehicle. For example, cushions 215 can be attached to the door clip 230 and/or to the bottom portion 214 of the gutter insert 210. The cushions 215 can be separate components or integrally formed with the door clip 230 and/or gutter insert 210. The cushions 215 can be made of a soft or otherwise non-abrasive material. This can advantageously prevent the attachment assembly 200 from scratching or otherwise damaging the finish of the vehicle to which it is attached. The cushions 215 can also create a tighter fit between the attachment assembly 200 and the vehicle. This can reduce movement or noise generated by the roof rack assembly 100 while the vehicle is moving.

In some embodiments, an angle θ (FIG. 8A) between the inner connecting surface 216 and the outer connecting surface 218 can form an acute angle. In some embodiments, the angle θ between the inner connecting surface 216 and the outer connecting surface 218 can be about 10, 15, 20, 25, 30, 35, 40, or 45°. In some embodiments, the angle θ between the inner connecting surface 216 and the outer connecting surface 218 can be greater than about 10, 15, 20, 25, 30, 35, 40, or 45°. In some embodiments, the angle θ between the inner connecting surface 216 and the outer connecting surface 218 can be less than about 10, 15, 20, 25, 30, 35, 40, or 45°. Further, as discussed above, the bottom portion 214 can space the inner connecting surface 216 from the outer connecting surface 218. Desirably, in some embodiments, the inner connecting surface 216 engages an inner surface portion of the roof gutter and the outer connecting surface 218 engages an outer surface portion of the gutter to at least partially secure the roof rack assembly 100 in place. Desirably, the bottom portion 214 defines an outer surface which engages the central portion of the gutter to provide support for the roof rack assembly 100.

In some embodiments, the gutter insert 210 is hollow between the surfaces. In some embodiments, the gutter insert 210 is not hollow. In some embodiments, the gutter insert 210 can have a length (e.g., measured the front of the vehicle to the back of the vehicle) that is the same as the length of the lateral bar 106. In some embodiments, the gutter insert 210 can have a length (e.g., measured the front of the vehicle to the back of the vehicle) that is greater than a length of the lateral bar 106. In some embodiments, the gutter insert 210 can have a length (e.g., measured the front of the vehicle to the back of the vehicle) that is less than a length of the lateral bar 106.

The attachment assembly 200 can further comprise a clamp, such as a door clip 230 as illustrated or other retaining mechanisms such as a flange or hook. In some embodiments, the clamp can attach to a ledge, ridge, or other structural feature having sufficient strength and durability to support a portion of the roof rack assembly 100. For example, some vehicles may have a roof overhang that the clamp can at least partially wrap around. In some embodiments, the clamp is configured to at least partially extend into and/or at least partially wrap around a frame of the vehicle, such as a door frame. In some embodiments, including the illustrated embodiment, the door clip 230 can include a gutter attachment surface 232, a vehicle attachment surface 234, and a flange (hook, clip) 236. The door clip 230 can comprise multiple components. The gutter attachment surface 232 and the vehicle attachment surface 234 can be adjoined at a bend 233. Thus, the flange 236 can be spaced away from the gutter attachment surface 232 by the vehicle attachment surface 234. In some embodiments, the door flange 230 can be adjustably connected to the gutter insert 210. Thus, the door flange 230 can be adjusted towards or away from the gutter insert 210 in order to accommodate different sized vehicles. The vehicle attachment surface 234 can be contoured in some embodiments to follow a portion of a vehicle. The flange 236 can be configured to at least partially wrap around a door frame to hold roof rack assembly 100 onto the vehicle to keep it in place. In some embodiments, the flange 236 does not affect the opening or closing of the doors of the vehicle. In some embodiments, the flange 230 may have a length of less than, the same as, or greater than the length of the gutter insert 210.

The gutter attachment surface 232 can be attached to the gutter insert 210 through fasteners such as screws, bolts, adhesives, etc. In some embodiments, the gutter attachment surface 232 can be spaced away from the gutter insert 210 by extension 238. The gutter attachment surface 232 can be adjustably moved with respect to the gutter insert 210, thus allowing for the roof rack assembly 100 to be used on different sized vehicles and to provide a tight fit on the vehicle. For example, as illustrated in FIGS. 9 and 10, the gutter attachment surface 232 and an outer connecting surface 218 of the gutter insert 210 can include slots 205, such as tracks, for fasteners to insert into. Thus, the fastener position can be adjusted within the slots 205 in order to adjust the position of the door clip 230 relative to the lateral bar 106 and/or the gutter insert 210. In some embodiments, the slots 205 can extend in different dimensions, such as vertically and/or horizontally, allowing further adjustability. For example, the slots 205 can extend vertically to advantageously allow the door clip 230 to move upwards and downwards relative to the lateral bar 106 and/or the gutter insert 210, thereby accommodating various types of vehicles with different gutters 211.

In some embodiments, the gutter insert 210 can change size/shape/dimension so that it can fit within different sizes of gutters. For example, the bottom portion 214 may be expandable or retractable in order to fit different sizes of gutters. Further, the inner connecting surface 216 and an outer connecting surface 218 can have variable heights so as to change a height of the body 102. In some embodiments, the dimensions can be changed while the roof rack assembly 100 is attached to a vehicle.

Thus, the roof rack assembly 100 can include a mounting assembly 200 (for example, an attachment assembly 200 can be disposed on each of the four corners of the roof rack) that can be sized to fit within rain gutters/ducts of a vehicle. This can allow the universal mounting roof rack assembly 100 to properly align on the vehicle.

Accordingly, a user would not have to drill, or otherwise permanently damage, the roof of the vehicle to install the roof rack assembly 100. Moreover, the universal roof rack assembly 100 can facilitate easy adjustment of the roof rack assembly 100 on a vehicle without damaging the roof, thus allowing for optimizing the position of the roof rack assembly 100 for different situations.

From the foregoing description, it will be appreciated that inventive roof rack assemblies are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A universal roof rack assembly for a vehicle, the universal roof rack assembly comprising:
   a roof rack body comprising at least one lateral bar extending along a width of the roof rack body;
   a plurality of attachment assemblies comprising:
      a connecting mount coupled to an end of the at least one lateral bar; and
      a gutter insert coupled to a bottom surface of the connecting mount and configured to extend within a rain gutter of the vehicle, wherein the gutter insert comprises an inner connecting surface, an outer connecting surface and an upward facing surface, wherein the inner connecting surface and the outer connecting surface are separated by an open space;
   wherein at least one of the connecting mount and the gutter insert comprise either at least one opening or a plurality of openings and another of the connecting mount and the gutter insert comprises at least one opening, wherein the at least one opening or plurality of openings of the at least one of the connecting mount and the gutter insert are sized and spaced to cooperate with at least one opening of the another of the connecting mount and the gutter insert to permit each of the plurality of attachment assemblies to be selectably secured to the roof rack body in a first position and a second position, wherein the roof rack assembly has a first width in the first position and a second width different than the first width in the second position.

2. The universal roof rack assembly of claim 1, wherein dimensions of the gutter insert are configured to be modified by a user.

3. The universal roof rack assembly of claim 1, wherein the at least one opening or plurality of openings are configured to receive a fastener to couple the gutter insert to the connecting mount.

4. The universal roof rack assembly of claim 3, wherein a position of the fastener can be adjusted within the at least one opening or between the plurality of openings to adjust the width of the roof rack assembly.

5. The universal roof rack assembly of claim 1, further comprising a clamp adjustably connected to the gutter insert and configured to at least partially extend into and at least partially wrap around a frame of the vehicle.

6. The universal roof rack assembly of claim 1, wherein the outer connecting surface comprises at least one opening.

7. The universal roof rack assembly of claim 6, further comprising a clamp comprising at least one opening and adjustably connected to the gutter insert.

8. The universal roof rack assembly of claim 7, wherein a height of the roof rack assembly is adjustable.

9. A vehicle having the universal roof rack assembly of claim 1 attached.

10. A universal roof rack assembly for a vehicle, the universal roof rack assembly comprising:
- a roof rack body;
- a plurality of attachment assemblies, each of the plurality of attachment assemblies attached to the roof rack body or a brace supporting the roof rack body, each of the plurality of attachment assemblies comprising:
  - a gutter insert configured to extend within a rain gutter of the vehicle, wherein the gutter insert comprises an inner connecting surface and an outer connecting surface separated by an open space; and
  - a clamp coupled to the outer connecting surface of the gutter insert, the clamp configured to at least partially extend into and at least partially wrap around a frame of the vehicle;
- wherein each of the gutter insert and the clamp comprise either at least one opening or a plurality of openings, each of the at least one opening or plurality of openings being sized and spaced to permit each of the plurality of attachment assemblies to be selectably secured to the roof rack body in a first position and a second position, wherein the roof rack assembly has a first height in the first position and a second height different than the first height in the second position.

11. The universal roof rack assembly of claim 10, wherein dimensions of the gutter insert are configured to be modified by a user.

12. The universal roof rack assembly of claim 10, wherein the at least one opening or plurality of openings are configured to receive a fastener to couple the clamp to the gutter insert.

13. The universal roof rack assembly of claim 12, wherein a position of the fastener can be adjusted within the at least one opening or between the plurality of openings to adjust the height of the roof rack assembly.

14. The universal roof rack assembly of claim 10, further comprising a connecting mount configured to couple the gutter insert to the roof rack body or the brace supporting the roof rack body.

15. The universal roof rack assembly of claim 14, wherein the connecting mount comprises a horizontal section having at least one opening.

16. The universal roof rack assembly of claim 15, wherein the gutter insert further comprises an upward facing surface comprising at least one opening corresponding to the at least one opening of the connecting mount.

17. The universal roof rack assembly of claim 16, wherein a width of the roof rack assembly is adjustable.

18. The universal roof rack assembly of claim 17, wherein the at least one opening of the upward facing surface and the connecting surface are configured to receive a fastener to couple the gutter insert to the roof rack body or the brace supporting the roof rack body.

19. The universal roof rack assembly of claim 18, wherein a position of the fastener can be adjusted within the openings to adjust the width of the roof rack assembly.

20. A vehicle having the universal roof rack assembly of claim 10 attached.

* * * * *